United States Patent
Hirosawa et al.

(10) Patent No.: US 9,490,064 B2
(45) Date of Patent: Nov. 8, 2016

(54) WIRELESS POWER TRANSMISSION METHOD

(75) Inventors: Atsushi Hirosawa, Utsunomiya (JP); Tomoaki Nakagawa, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 499 days.

(21) Appl. No.: 14/131,214

(22) PCT Filed: Jul. 27, 2012

(86) PCT No.: PCT/JP2012/069185
§ 371 (c)(1),
(2), (4) Date: Jan. 7, 2014

(87) PCT Pub. No.: WO2013/015416
PCT Pub. Date: Jan. 31, 2013

(65) Prior Publication Data
US 2014/0145516 A1 May 29, 2014

(30) Foreign Application Priority Data

Jul. 28, 2011 (JP) ................................. 2011-165368

(51) Int. Cl.
*H01F 27/42* (2006.01)
*H01F 38/14* (2006.01)
(Continued)

(52) U.S. Cl.
CPC ............. *H01F 38/14* (2013.01); *B60L 11/182* (2013.01); *B60L 11/1833* (2013.01); *H02J 5/005* (2013.01);
(Continued)

(58) Field of Classification Search
CPC .............. B60L 11/182; B60L 2210/10; B60L 2240/36; Y02T 10/7072; Y02T 90/125; H01F 38/14; H02J 5/005; H02J 7/025
USPC ......................................................... 307/104
See application file for complete search history.

(56) References Cited

U.S. PATENT DOCUMENTS

| | | | |
|---|---|---|---|
| 2011/0049995 A1* | 3/2011 | Hashiguchi | H02J 5/005 307/104 |
| 2011/0121778 A1* | 5/2011 | Oyobe | B60L 5/005 320/108 |

(Continued)

FOREIGN PATENT DOCUMENTS

| | | |
|---|---|---|
| JP | 2010-141977 A | 6/2010 |
| JP | 2011-050140 A | 3/2011 |

(Continued)

OTHER PUBLICATIONS

International Search Report dated Oct. 23, 2012 corresponding to International Patent Application No. PCT/JP2012/069185 and English translation thereof.

(Continued)

*Primary Examiner* — Jared Fureman
*Assistant Examiner* — Duc M Pham
(74) *Attorney, Agent, or Firm* — Squire Patton Boggs (US) LLP

(57) ABSTRACT

A wireless power transmission method transmits power from a first resonance antenna to a second resonance antenna in a noncontact manner through resonance of a magnetic field. The first resonance antenna is a resonance antenna of a power transmitting device, the second resonance antenna is a resonance antenna of a power receiving device. The wireless power transmission method includes setting a first transmission efficiency between the first resonance antenna and the second resonance antenna by changing a frequency of supply power of the power transmitting device. Power transmitted from the first resonance antenna to the second resonance antenna is gradually increased. A resonance frequency is changed by changing an induction coefficient or electrostatic capacity of the second resonance antenna to change the transmission efficiency between the first and second resonance antenna to a second transmission efficiency smaller than the first transmission efficiency, thereby matching received power to required power.

3 Claims, 11 Drawing Sheets

(51) Int. Cl.
  *B60L 11/18* (2006.01)
  *H02J 5/00* (2016.01)
  *H02J 7/02* (2016.01)

(52) U.S. Cl.
  CPC ............ *H02J 7/025* (2013.01); *B60L 2210/10* (2013.01); *B60L 2210/30* (2013.01); *B60L 2210/40* (2013.01); *B60L 2240/36* (2013.01); *B60L 2240/80* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

2011/0187321 A1    8/2011   Hirayama
2012/0098330 A1*   4/2012   Ichikawa ............... B60L 11/123
                                                          307/9.1
2014/0285029 A1*   9/2014   Ichikawa .................. B60L 7/14
                                                          307/104
2014/0354068 A1*  12/2014   Horiuchi ................. B60L 11/14
                                                          307/104
2015/0115704 A1*   4/2015   Gorai ....................... B60L 7/14
                                                          307/9.1

FOREIGN PATENT DOCUMENTS

| JP | 2011-120450 A | 6/2011 |
| WO | WO 2009/054221 A1 | 4/2009 |
| WO | WO 2010/030005 A1 | 3/2010 |
| WO | 2010/058682 A1 | 5/2010 |
| WO | WO 2011/086694 A1 | 7/2011 |

OTHER PUBLICATIONS

Chinese Office Action application No. 201280035367.6 issued on May 27, 2015.

* cited by examiner

FIG. 9
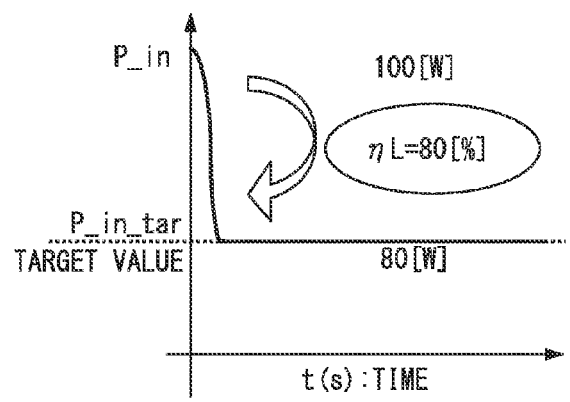
FIG. 10
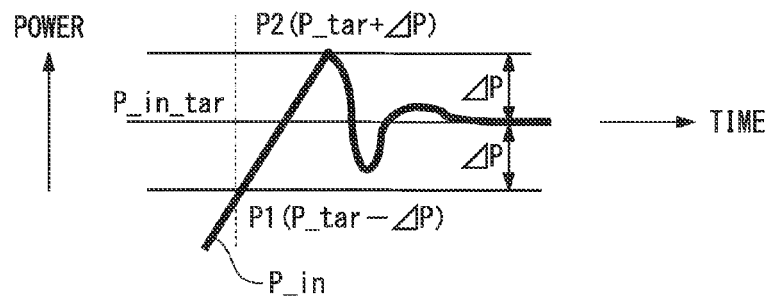
FIG. 11
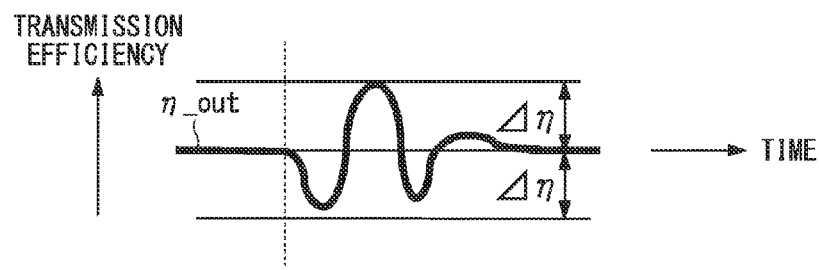
FIG. 12

WIRELESS POWER TRANSMISSION METHOD

TECHNICAL FIELD OF THE INVENTION

The present invention relates to a wireless power transmission method.

Priority is claimed on Japanese Patent Application No. 2011-165368, filed Jul. 28, 2011, the content of which is incorporated herein by reference.

BACKGROUND ART

In the related art, a technique is known in which, when charging a battery of an electric vehicle with power output from a feed device in a wireless manner, various control signals for use in charging the battery are superimposed on AC power by an ASK modulation scheme or the like, and the transmission/reception of the control signals is performed between a power transmission side and a power reception side (for example, see Patent document 1).

PRIOR ART DOCUMENTS

Patent Documents

Patent Document 1: PCT International Publication No. WO2010/030005

SUMMARY OF THE INVENTION

Problems to be Solved by the Invention

However, in the above-described wireless power transmission of the related art, while the control signals are superimposed on AC power and the amount of communication equipment is thus reduced to simplify the system, there is still a need for equipment which superimposes the control signals on AC power. In the above-described wireless power transmission of the related art, since required power of a vehicle on a power reception side is not recognized, there is a problem in that power continues to be transmitted one-sidedly and optimum power transmission is not performed.

The invention has been accomplished in consideration of the above-described situation, and an object of the invention is to provide a wireless power transmission method capable of optimizing power supply according to required power of a power reception side without complicating a device configuration.

Means for Solving the Problems

In order to solve the above-described problem and to attain the concerned object, the invention introduces the following means.

(1) According to an aspect of the invention, there is provided a wireless power transmission method that transmits power from a first resonance antenna to a second resonance antenna in a noncontact manner through resonance of a magnetic field, the first resonance antenna being a resonance antenna of a power transmitting device, the second resonance antenna being a resonance antenna of a power receiving device, the wireless power transmission method includes the steps of: setting transmission efficiency between the first resonance antenna and the second resonance antenna as first transmission efficiency by changing a frequency of supply power of the power transmitting device, gradually increasing power transmitted from the first resonance antenna to the second resonance antenna, and changing a resonance frequency by change of at least one of an induction coefficient and electrostatic capacity of the second resonance antenna to change the transmission efficiency between the first resonance antenna and the second resonance antenna to second transmission efficiency smaller than the first transmission efficiency, thereby matching received power to required power of the power receiving device.

(2) In the wireless power transmission method described in (1), the power transmitting device may monitor the transmission efficiency between the first resonance antenna and the second resonance antenna and may estimate the required power on the basis of the change in the transmission efficiency.

(3) In the wireless power transmission method described in (2), the power transmitting device may change transmission power so as to become equal to the estimated required power, and the power receiving device may change the resonance frequency by change of at least one of the induction coefficient and the electrostatic capacity of the second resonance antenna such that the received power becomes equal to the required power, thereby changing the transmission efficiency between the first resonance antenna and the second resonance antenna to third transmission efficiency greater than the second transmission efficiency.

Effect of the Invention

According to the aspect described in above-mentioned (1), it is possible to change the resonance frequency by a change of at least one of the induction coefficient and electrostatic capacity of the resonance antenna of the power receiving device, thereby matching the received power to the required power of the power receiving device. For this reason, it is possible to prevent the resonance antenna of the power receiving device from being overheated due to the supply of excessive power.

Since it is possible to match the received power to the required power of the power receiving device without using communication equipment or signal conversion equipment which transmits information regarding the required power from the power receiving device to the power transmitting device, it is possible to prevent the device configuration from becoming complicated.

When the required power of the power receiving device is zero, for example, when charging is not required, it is also possible to make the received power zero by changing the resonance frequency.

According to the aspect described in above-mentioned (2), on the basis of the transmission efficiency between the resonance antenna of the power transmitting device and the resonance antenna of the power receiving device when the received power is matched to the required power of the power receiving device by a change of the resonance frequency on the power receiving device side, in the power transmitting device, it is possible to estimate the required power of the power receiving device from the transmission efficiency and the transmission power after change of the resonance frequency on the power receiving device. Therefore, it is possible to reduce the number of components compared to a case where a device which transmits and receives information regarding the required power is provided.

According to the aspect described in above-mentioned (3), if the transmission power is changed so as to become the required power estimated in the power transmitting device, since the received power decreases, the resonance frequency is changed such that the transmission efficiency increases on the power receiving device side so as to compensate for the decrease. Therefore, it is possible to transmit the transmission power, according to the required power on the power receiving device side, with high transmission efficiency.

BRIEF DESCRIPTION OF THE DRAWINGS

FIG. 9 is a map of each combination of transmitting antenna and receiving antenna.

FIG. 10 is a graph showing an example where received power decreases to required power.

FIG. 11 is a graph showing an example where received power converges on a received power target value by variable frequency processing.

FIG. 12 is a graph showing an example where transmission efficiency of a power transmitting device side converges within a predetermined range by variable frequency processing.

DESCRIPTION OF EMBODIMENTS

Next, a wireless charging system to which a wireless power transmission method according to a first embodiment of the invention is applied will be described with reference to the drawings.

Figure 1:
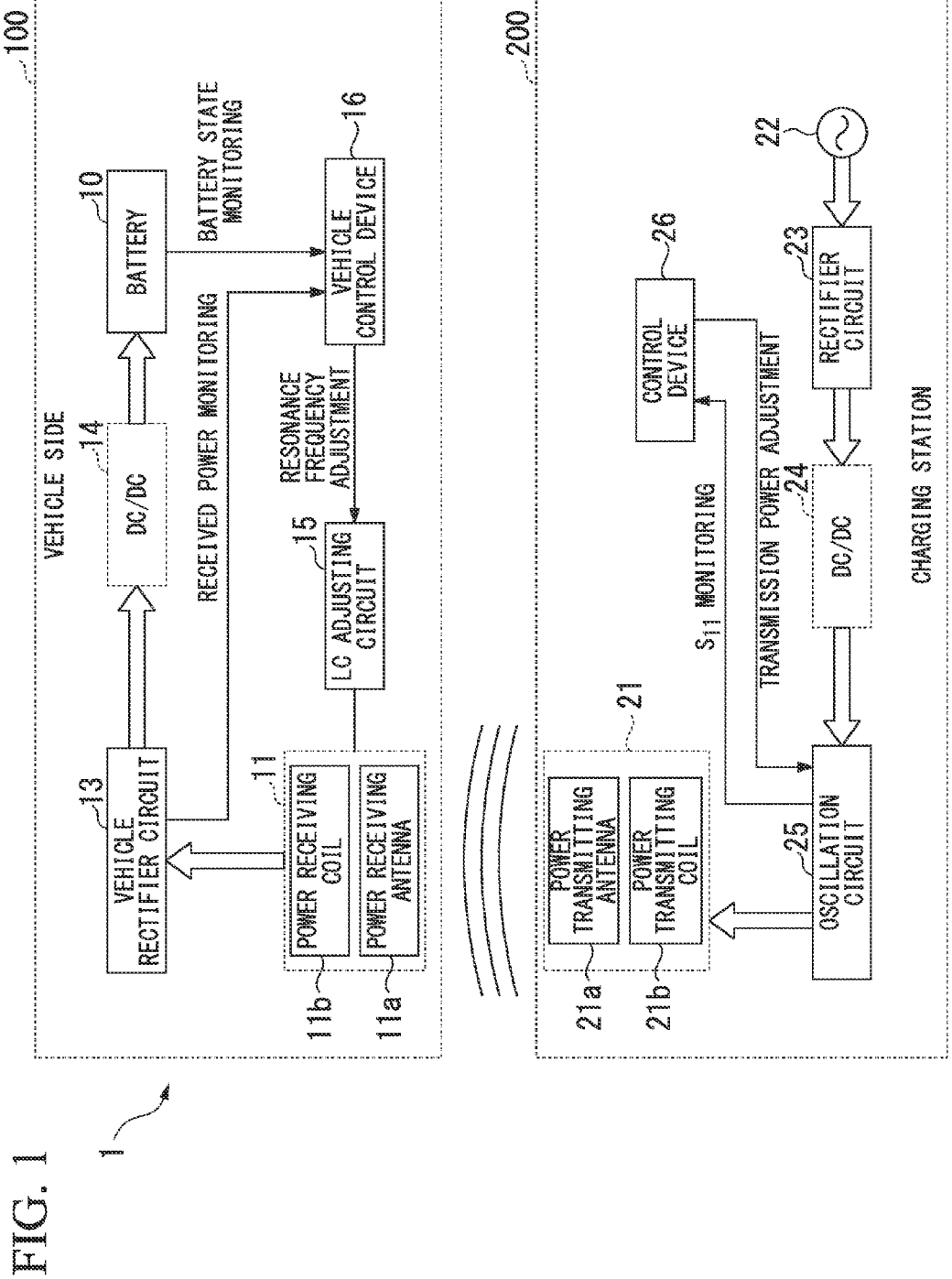
FIG. 1 is a block diagram showing the configuration of a wireless charging system according to a first embodiment of the invention.

As shown in FIG. 1, a wireless charging system 1 of this embodiment includes a vehicle 100 which includes a motor, such as a three-phase DC brushless motor, generating a traveling driving force, and a charging station 200 which supplies charging power to the vehicle 100.

The wireless charging system 1 transmits power output from the charging station 200 (power transmitting device side) to the vehicle 100 (power receiving device side) in a noncontact manner by a resonant-type wireless power transmission scheme using a resonance phenomenon, and charges a battery 10 mounted in the vehicle 100.

The vehicle 100 includes a receiving antenna 11 below a floor panel or the like. The charging station 200 includes a transmitting antenna 21 on a road on which the vehicle 100 travels, a facility in which the vehicle 100 parks, or the like.

The transmitting antenna 21 of the charging station 200 includes a power transmitting antenna 21a and a power transmitting coil 21b. The receiving antenna 11 of the vehicle 100 includes a power receiving antenna 11a and a power receiving coil 11b.

In a resonant-type wireless power transmission scheme, power is transmitted through resonance of a magnetic field between a resonator (not shown) on the vehicle 100 including the power receiving coil 11b and a resonator (not shown) on the charging station 200 including the power transmitting coil 21b.

The power transmitting coil 21b serving as a primary coil is arranged near the power transmitting antenna 21a of the charging station 200. The power receiving coil 11b serving as a secondary coil is arranged near the power receiving antenna 11a of the vehicle 100. If a primary current flows through the power transmitting coil 21b, an induced current flows in the power transmitting antenna 21a by electromagnetic induction, and the power transmitting antenna 21a resonates at a resonance frequency according to inductance and stray capacitance of the resonator on the charging station 200 which includes the power transmitting coil 21b. Accordingly, the power receiving antenna 11a facing the power transmitting antenna 21a resonates at the resonance frequency, a secondary current flows in the power receiving antenna 11a, and the secondary current flows in the power receiving coil 11b near the power receiving antenna 11a by electromagnetic induction.

The charging station 200 includes an AC power supply 22, a rectifier circuit 23, a DC/DC converter 24, an oscillation circuit 25, and a control device 26, in addition to the transmitting antenna 21.

AC power supplied from the AC power supply 22 is converted into DC power by the rectifier circuit 23. Power converted into DC by the rectifier circuit 23 is supplied to the oscillation circuit 25 after a voltage-conversional is performed to the converted DC power by the DC/DC converter 24.

The oscillation circuit 25 converts DC power output from the DC/DC converter 24 into AC power at a predetermined frequency for use in the resonant-type wireless power transmission scheme according to a control signal from the control device 26. The oscillation circuit 25 adjusts transmission power P_out (W) output to the receiving antenna 11 via the transmitting antenna 21 according to a control signal from the control device 26. The oscillation circuit 25 transmits information, regarding an incident wave and a reflected wave for obtaining an input reflection coefficient (hereinafter, simply referred to as an $S_{11}$ parameter) relating to an S parameter (scattering parameter) of a transmitting/receiving circuit network having the transmitting antenna 21 and the receiving antenna 11, to the control device 26.

The control device 26 obtains the $S_{11}$ parameter from the information regarding the incident wave and the reflected wave received from the oscillation circuit 25, and calculates transmission efficiency η of power transmission from the $S_{11}$ parameter. The control device 26 obtains a transmission power target value P_out_tar, which is the estimated value of required power P_in_tar of the vehicle 100 (power receiving device), on the basis of the transmission efficiency η and the transmission power P_out. The control device 26 outputs a control signal, which adjusts the transmission power P_out so as to become the transmission power target value P_out_tar, to the oscillation circuit 25. The $S_{11}$ parameter is obtained by the ratio ($S_{11}$=b1/a1) of an incident wave a1 from the oscillation circuit 25 to the transmitting antenna 21 and a reflected wave b1 from the transmitting antenna 21. The incident wave a1 and the reflected wave b1 can be detected by, for example, a directional coupler.

The vehicle 100 includes a battery 10 for motor driving, a vehicle rectifier circuit 13, a vehicle DC/DC converter (DC/DC) 14, an LC adjusting circuit 15, and a vehicle control device 16, in addition to the receiving antenna 11.

The battery 10 is charged with power transmitted from the charging station 200 by the resonant-type wireless power transmission scheme, and supplies power to various kinds of equipment mounted in the vehicle 100, such as a motor which generates the traveling driving force.

The vehicle rectifier circuit 13 converts AC power received by the receiving antenna 11 to DC power. The vehicle rectifier circuit 13 includes a detection unit (not shown) which detects received power P_in (W) input from the receiving antenna 11, and outputs information regarding the detected received power P_in to the vehicle control device 16.

The vehicle DC/DC converter 14 converts the output voltage of the vehicle rectifier circuit 13 to a charging voltage of the battery 10.

Figure 2:
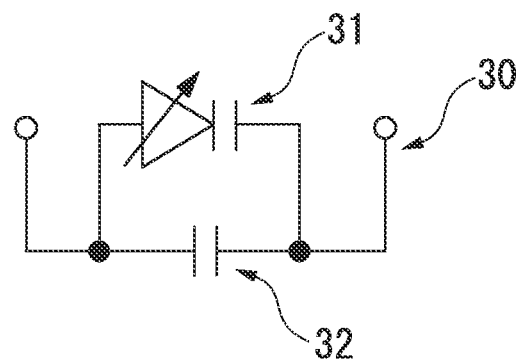
FIG. 2 is a circuit diagram showing an example of an LC adjusting circuit in the wireless charging system.

The LC adjusting circuit 15 changes at least one of an induction coefficient (L) and electrostatic capacity (C) of a resonance antenna according to a control command from the vehicle control device 16 to adjust the resonance frequency F of the receiving antenna 11 by the resonant-type wireless power transmission scheme. FIG. 2 shows an example of a capacitance variable circuit 30 of the LC adjusting circuit 15, and the capacitance variable circuit 30 can be constituted by, for example, parallel connection of a variable capacitance diode 31 and a capacitor 32. In this way, with the use of the variable capacitance diode 31, a mechanical adjustment mechanism is not required and reliability is improved. In the above description, although the capacitance variable configuration has been described as an example, the induction coefficient may be adjusted by an inductometer or the like.

The vehicle control device 16 monitors a battery charging state SOC (state of charge) by, for example, a current integration method or the like to obtain required power P_in_tar of the battery 10 or the like on the vehicle 100. The vehicle control device 16 outputs a control command to adjust the resonance frequency F in the resonant-type wireless power transmission scheme to the LC adjusting circuit 15 on the basis of information of the received power P_in input from the vehicle rectifier circuit 13 and the required power P_in_tar, such that the received power P_in becomes the required power P_in_tar.

The DC/DC converter 24 of the charging station 200 described above may be omitted if the output voltage of the rectifier circuit 23 can be used as the input voltage of the oscillation circuit 25. The vehicle DC/DC converter 14 may also be omitted if the output voltage of the vehicle rectifier circuit 13 can be used as the input voltage of the battery 10. In FIG. 1, the flow of power is indicated by an outline arrow, and the flow of a control signal is indicated by a solid arrow.

Figure 3:
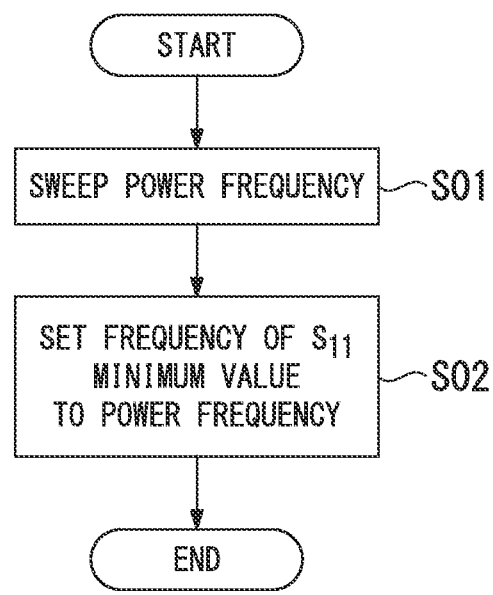
FIG. 3 is a flowchart of power transmission initial processing which is executed on a power transmitting device of the wireless charging system.

Next, a power transmission-side initial processing by the control device 26 of the charging station 200 will be described referring to the flowchart of FIG. 3. The power transmission-side initial processing is control processing which is initially performed when starting wireless power transmission.

First, in Step S01 shown in FIG. 3, the control device 26 sweeps the oscillation frequency (hereinafter, simply referred to as a power frequency) of the oscillation circuit 25, that is, changes the oscillation frequency in a predetermined frequency range set in advance for use in a wireless power transmission scheme.

Next, in Step S02, as a result of sweeping, a frequency at which the $S_{11}$ parameter becomes a minimum value is obtained, and the frequency is set as the power frequency.

With the use of the $S_{11}$ parameter described above, transmission efficiency (η) between the transmitting antenna 21 and the receiving antenna 11 can be obtained by Expression (1).

[Equation 1]

$$\eta = (1 - |S11|^2) \times 100\% \qquad (1)$$

That is, as the $S_{11}$ parameter increases, the transmission efficiency decreases, and as the $S_{11}$ parameter decreases, the transmission efficiency increases.

For example, when the $S_{11}$ parameter is minimal, transmission efficiency out calculated on the power transmitting device becomes a maximum value (hereinafter, simply referred to as a maximum value ηmax), and the maximum value ηmax is first transmission efficiency in this embodiment.

Figure 4:
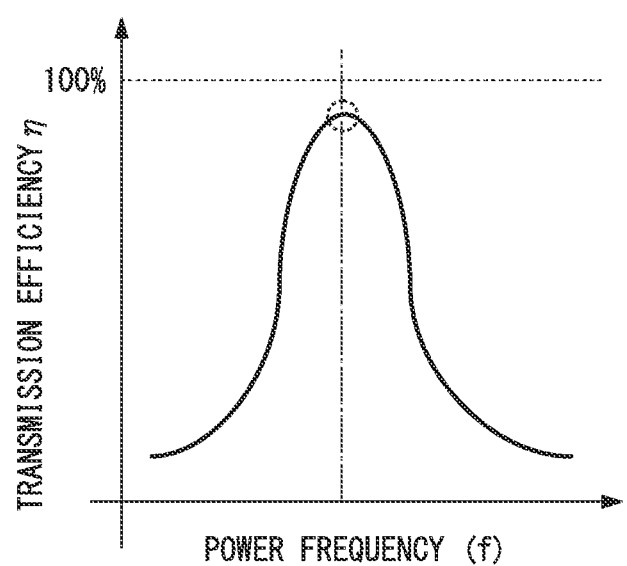
FIG. 4 is a graph showing a relationship between power frequency and transmission efficiency.

FIG. 4 is a graph in which the vertical axis represents the transmission efficiency (η) and the horizontal axis represents the power frequency (f). A frequency (in FIG. 4, indicated by a one-dot-chain line) equivalent to the peak of a crest of the graph is the frequency at which the $S_{11}$ parameter is minimal.

Figure 5:
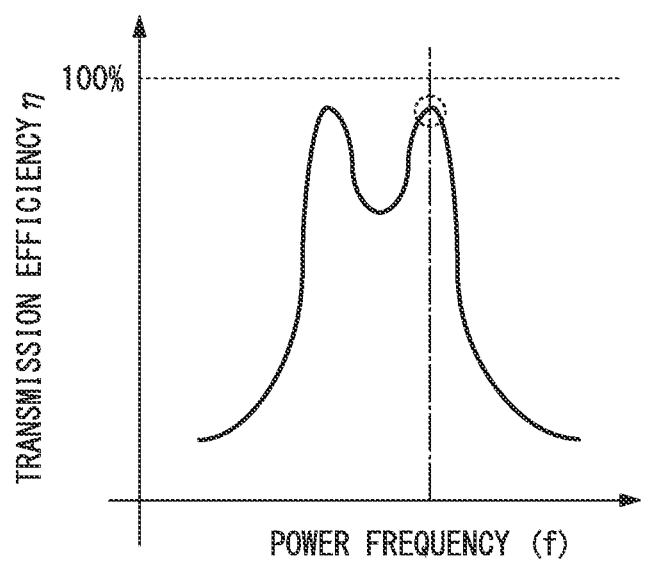
FIG. 5 is a graph showing a relationship between power frequency and transmission efficiency, and is a graph showing an example where there are two crests.

In FIG. 4, although a case where the number of crests of the graph is one is shown, the shape of the crest is not limited to that shown in FIG. 4. For example, as shown in FIG. 5, the number of crests may be two. In an example of FIG. 5, a frequency at which transmission efficiency is maximal (=the $S_{11}$ parameter is minimal) becomes the peak of the right crest.

Next, power transmission-side processing in the control device 26 of the charging station 200 will be described with reference to a flowchart.

Figure 6:
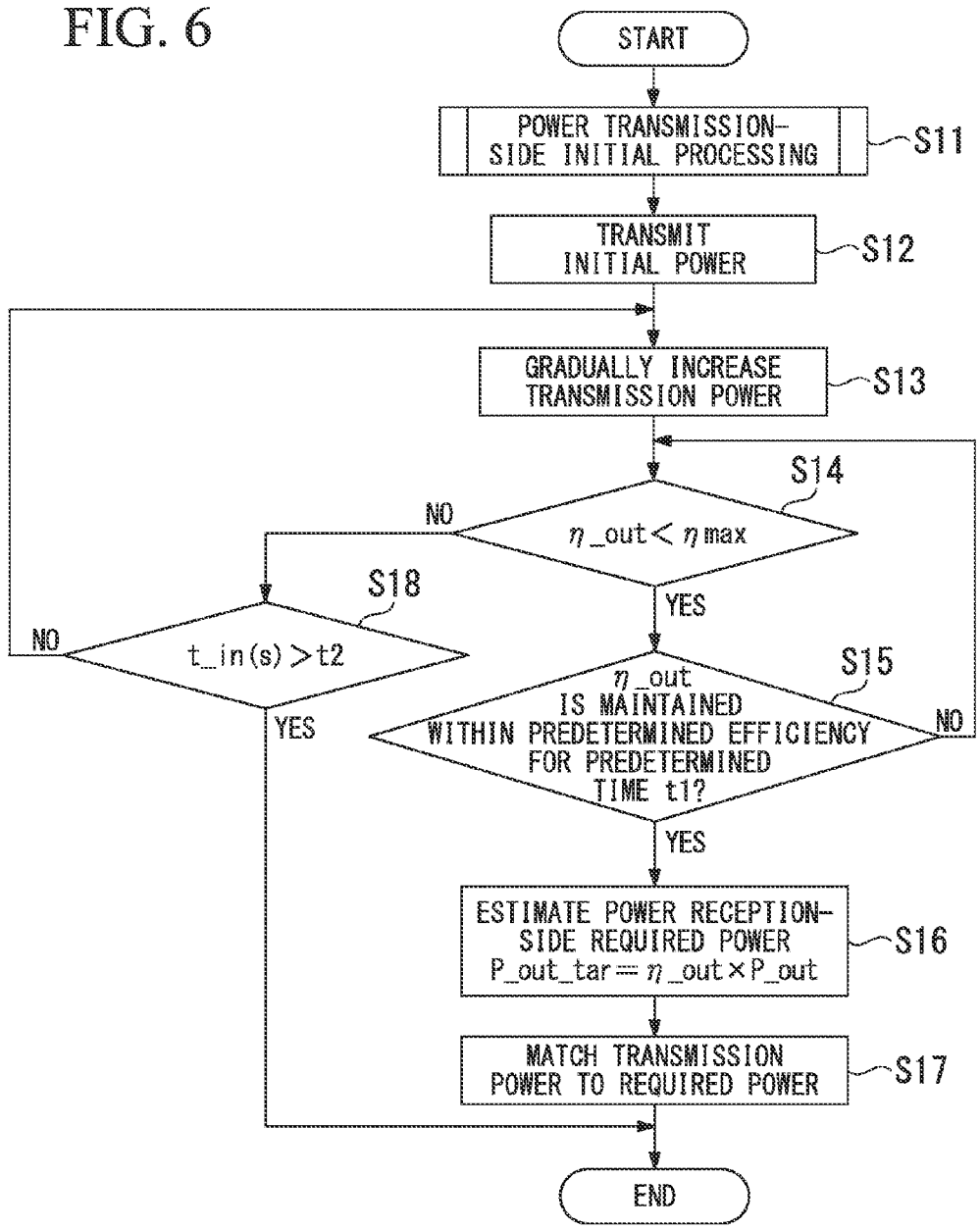
FIG. 6 is a flowchart of power transmission-side processing of the wireless charging system.

First, in Step S11 shown in FIG. 6, the control device 26 executes the above-described power transmission-side initial processing.

In Step S12, power transmission starts at the power frequency at which the transmission efficiency obtained in the above-described power transmission-side initial processing becomes the maximum value ηmax.

Next, in Step S13, the transmission power P_out is gradually increased by the oscillation circuit 25.

Next, in Step S14, it is determined whether or not the transmission efficiency η_out calculated at the charging station 200 (power transmitting device side) by using the $S_{11}$ parameter is smaller than the maximum value ηmax of the transmission efficiency, in other words, it is determined whether or not the transmission efficiency η_out decreases from the maximum value ηmax. On the other hand, when the determination result is "NO" (η_out≥ηmax), the process progresses to Step S18. When the determination result in Step S14 is "YES" (η_out<ηmax), the process progresses to Step S15. Here, a case where the transmission efficiency $\eta\_out$ decreases from the maximum value $\eta max$ is a case where the resonance frequency F is changed from an initial value by the LC adjusting circuit 15 of the vehicle 100 such that the received power P_in becomes the required power P_in_tar.

In Step S18, since the transmission efficiency $\eta\_out$ is still not yet lower than $\eta max$, it is determined whether or not a required power estimation period t_in (s) is greater than a predetermined elapsed time t2, which is a threshold value of the required power estimation period t_in (s) set in advance.

When the determination result is "YES" (t_in (s)>t2), since it is a state in which the transmission efficiency $\eta\_out$ does not decrease by any factor, a sequence of processing temporarily ends.

On the other hand, when the determination result is "NO" (t_in (s)≤t2), the process returns to the above-mentioned processing in Step S13, and continues to increase the transmission power P_out.

The predetermined elapsed time t2, which is set in advance. is the upper limit value of the time necessary for a sequence of control processing until the control device 26 obtains the transmission power target value P_out_tar as the estimated value of the required power P_in_tar of the vehicle 100 and matches the transmission power P_out to the transmission power target value P_out_tar.

In Step S15, it is determined whether or not the transmission efficiency $\eta\_out$ is maintained within predetermined efficiency for a predetermined time t1. That is, it is determined whether or not the transmission efficiency $\eta\_out$ is in a stable state which is decreased lower than the maximum value $\eta max$.

When the determination result is "NO" (the transmission efficiency $\eta\_out$ is not maintained within predetermined efficiency), the process returns to the processing in Step S14.

On the other hand, when the determination result is "YES" (the transmission efficiency $\eta\_out$ is maintained within predetermined efficiency), since the transmission efficiency $\eta\_out$ is in a stable state which is decreased lower than the maximum value $\eta max$, the process progresses to Step S16. As described above, for example, the transmission efficiency $\eta\_out$, which appears when the resonance frequency F is changed such that the received power P_in becomes the required power P_in_tar, is second transmission efficiency in this embodiment.

In Step S16, the transmission efficiency $\eta\_out$, which is stable and lower than the maximum value $\eta max$, and the transmission power P_out are integrated to obtain the transmission power target value P_out_tar, which is the estimated value of the required power P_in_tar of the vehicle 100. That is, in the charging station 200 (power transmitting device side), the transmission power target value P_out_tar, which is the estimated value of the required power P_in_tar of the vehicle 100, is obtained on the basis of change in the transmission efficiency $\eta\_out$. Additionally, as described above, with the use of the stable transmission efficiency $\eta\_out$, the more accurate transmission power target value P_out_tar can be obtained.

Next, in Step S17, the transmission power P_out is changed so as to match the estimated required power P_in_tar, in other words, the transmission power P_out is changed so as to become equal to the transmission power target value P_out_tar, and then a sequence of processing described above temporarily ends.

Next, power reception-side processing in the vehicle control device 16 of the vehicle 100 will be described referring to a flowchart.

Figure 7:
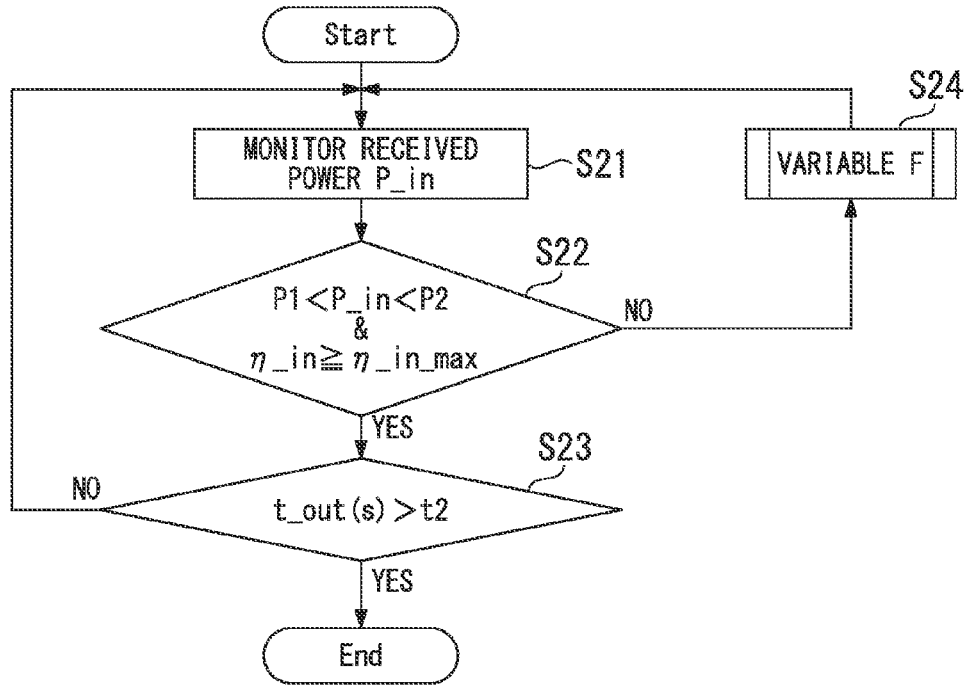
FIG. 7 is a flowchart of power reception-side processing of the wireless charging system.

First, in Step S21 shown in FIG. 7, the vehicle control device 16 monitors the received power P_in.

Next, in Step S22, it is determined whether or not the received power P_in is within a predetermined received power range between a predetermined lower limit P1 and a predetermined upper limit P2, and the transmission efficiency $\eta\_in$ on the vehicle 100 side is equal to or greater than the maximum value $\eta\_in\_max$ which is the threshold value of predetermined transmission efficiency set in advance.

The lower limit P1 is a value obtained by subtracting a predetermined power range $\Delta P$ from the required power P_in_tar. The upper limit P2 is a value obtained by adding the predetermined power range $\Delta P$ to the required power P_in_tar.

The transmission efficiency $\eta\_in$ on the vehicle 100 can be obtained by a table or a map (not shown) of the resonance frequency F and the transmission efficiency $\eta\_in$. For example, the transmission efficiency $\eta\_in$ is correlated with the resonance frequency F which is adjusted by the LC adjusting circuit 15. As the resonance frequency F on the reception side is close to the frequency at which the above mentioned transmission efficiency $\eta\_out$ is maximal, the transmission efficiency $\eta\_in$ increases, and on the other hand, as the resonance frequency F on the reception side is far from the frequency at which the transmission efficiency $\eta\_out$ is maximal, the transmission efficiency $\eta\_in$ decreases.

When the determination result in the above mentioned Step S22 is "YES" (P1<P_in <P2 and $\eta\_in \geq \eta\_in\_max$), the process progresses to Step S23.

On the other hand, when the determination result is "NO" (P1<P_in<P2 and $\eta\_in \geq \eta\_in\_max$ are not satisfied), the process progresses to Step S24. The initial value of the transmission efficiency $\eta\_in$ becomes $\eta\_in \geq \eta\_in\_max$.

When there is change in the required power P_in_tar, when there is a great difference between the required power P_in_tar and the received power P_in, or the like, the received power P_in is not within the range $\Delta P$ of the required power P_in_tar. As a result, the determination result in Step S22 is "NO". On the other hand, when there is no change in the required power P_in_tar, the determination result in Step S22 is "YES".

In Step S24, variable frequency (variable F) processing is performed in order to bring the received power P_in within the predetermined range $\Delta P$ of the required power P_in_tar, and the process returns to Step S21. That is, the processing in Step S21, Step S22, and Step S24 is repeated until the received power P_in is within the predetermined range $\Delta P$ of the required power P_in_tar, and the transmission efficiency $\eta\_in$ is equal to or greater than the maximum value $\eta\_in\_max$.

In Step S23, it is determined whether or not the time t_out (s) is greater than the predetermined elapsed time t2, the time t_out (s) being a time in which the above mentioned received power P_in is within the predetermined received power range $\Delta P$ between the predetermined lower limit P1 and the predetermined upper limit P2, and in which the transmission efficiency $\eta\_in$ is equal to or greater than the maximum value $\eta\_in\_max$ of predetermined transmission efficiency set in advance.

When the determination result is "NO" (t_out (s)≤t2), the process returns to the processing in Step S21, and a sequence of processing described above is repeated.

That is, a sequence of processing described above is repeated until a stable state is maintained in which the received power P_in is within the predetermined range $\Delta P$ of the required power P_in_tar, and the transmission efficiency η_in is a sufficiently high value equal to or greater than the maximum value η_in_max.

On the other hand, when the determination result in Step S23 is "YES" (t_out (s)>t2), since the stable state in which the received power P_in is within the predetermined range ΔP of the required power P_in_tar, and the transmission efficiency η_in is in a sufficiently high value is maintained, a sequence of processing described above temporarily ends.

Next, the variable frequency (F) processing in Step S21 described above will be described with reference to a flowchart. The variable frequency processing is control processing of the resonance frequency F for converging the received power P_in within the predetermine range (±ΔP) of the target value P_in_tar.

Figure 8:
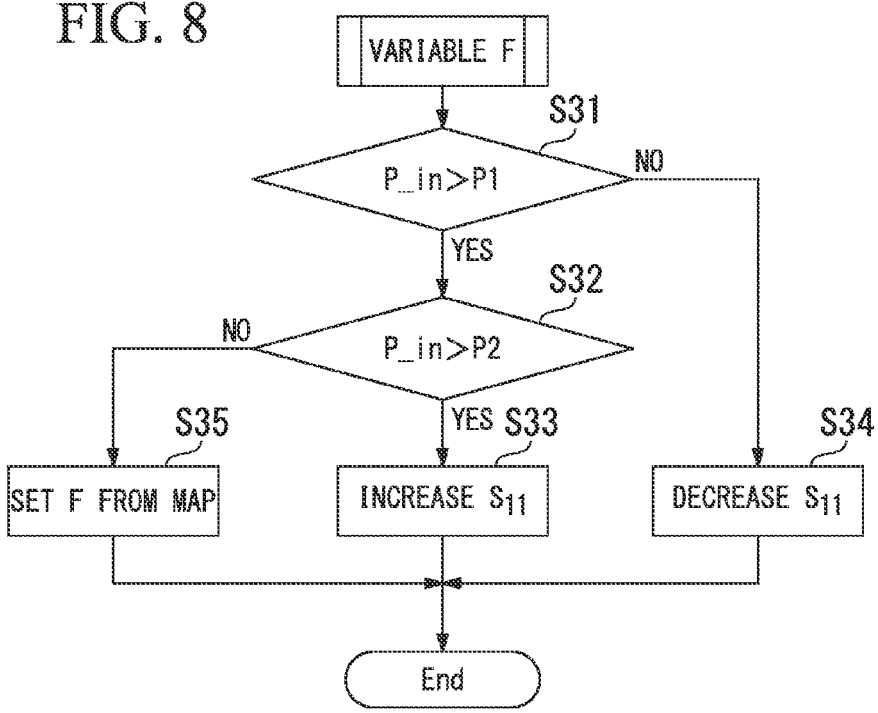
FIG. 8 is a flowchart of variable frequency processing of FIG. 7.

First, in Step S31 shown in FIG. 8, the vehicle control device 16 determines whether or not the received power P_in is greater than the predetermined lower limit P1.

When the determination result is "NO" (P_in≤P1), the process progresses to Step S34.

When the determination result is "YES" (P_in>P1), the process progresses to Step S32.

In Step S34, the resonance frequency F is changed by a predetermined frequency in a direction of decreasing the $S_{11}$ parameter, that is, such that the transmission efficiency η_in increases by the LC adjusting circuit 15, and then a sequence of processing described above temporarily ends.

That is, a sequence of processing described above is repeated until the received power P_in becomes greater than the lower limit P1.

In Step S32, it is determined whether or not the received power P_in is greater than the predetermined upper limit P2.

When the determination result is "YES" (P_in>P2), the process progresses to Step S33.

When the determination result is "NO" (P_in≤P2), the process progresses to Step S35.

In Step S33, the resonance frequency F is changed by a predetermined frequency in a direction of increasing the $S_{11}$ parameter, that is, such that the transmission efficiency η_in decreases, and then a sequence of processing described above temporarily ends. That is, a sequence of processing is repeated until the received power P_in becomes equal to or smaller than the upper limit P2.

In Step S35, the resonance frequency F is set from the map, and then a sequence of processing described above temporarily ends.

That is, according to the above-described variable frequency processing, as shown in FIG. 11, when the received power P_in is greater than the lower limit P1 and equal to or smaller than the upper limit P2, the resonance frequency F at which the received power P_in becomes the required power P_in_tar is determined by feedforward control with map reference, and the received power P_in can converge on the required power P_in_tar quickly. By converging the received power P_in on the required power P_in_tar, as shown in FIG. 12, the transmission efficiency η_out also converges within a predetermined range Δη, and thus, in Step S15, it is determined that the transmission efficiency η_out is in a stable state.

A target value (hereinafter, referred to as a transmission efficiency target value) ηtar of transmission efficiency on the power receiving device side (vehicle 100 side) can be represented by Expression (2).

[Equation 2]

$$\eta tar = (\eta L \times \eta)/100 [\%] \quad (2)$$

In Expression (2), "ηL" is a change rate of the received power P_in, and "η" denotes current transmission efficiency.

The change rate ηL of the received power P_in can be represented by Expression (3) of the required power P_in_tar and the current received power P_in.

[Equation 3]

$$\eta L = \frac{P\_in\_tar}{P_{in}} \times 100[\%] \quad (3)$$

The resonance frequency F at which the transmission efficiency target value ηtar is obtained can be obtained from the transmission efficiency target value ηtar, for example, with reference to a table shown in Table 1.

TABLE 1

| | ηtar [%] | | | | | |
|---|---|---|---|---|---|---|
| | 90 | 80 | 72 | ... | 10 | 1 |
| F [MHz] | 1.0 | 0.9 | 0.85 | ... | 0.6 | 0.01 |

In the wireless power transmission scheme of the vehicle, it is assumed that there are multiple transmitting antennas 21 and receiving antennas 11 having different characteristics. For this reason, the above-described table is required for each combination of transmitting antenna 21 and receiving antenna 11. Accordingly, the table may be stored in advance as a map for each combination of transmitting antenna 21 and receiving antenna 11 shown in FIG. 9.

If the resonance frequency F is determined by the map, the LC by the LC adjusting circuit 15 can be determined using Expression (4).

[Equation 4]

$$LC = \frac{1}{4\pi^2 F^2} \quad (4)$$

As shown in FIG. 10, when the resonance frequency F on the power reception side changes, for example, when the current received power P_in=100 [W] changes to the required power P_in_tar=80 [W], the change rate ηL of the received power P_in becomes 80% with respect to that before the change. When the current received power P_in is transmitted with the transmission efficiency η=90%, the transmission efficiency target value ηtar becomes (90%× 80)/100=72%. The LC of the LC adjusting circuit 15 is set such that the resonance frequency F becomes the resonance frequency F (in the above-described table, 0.85 MHz) associated with the transmission efficiency target value ηtar=72%.

Figure 13:
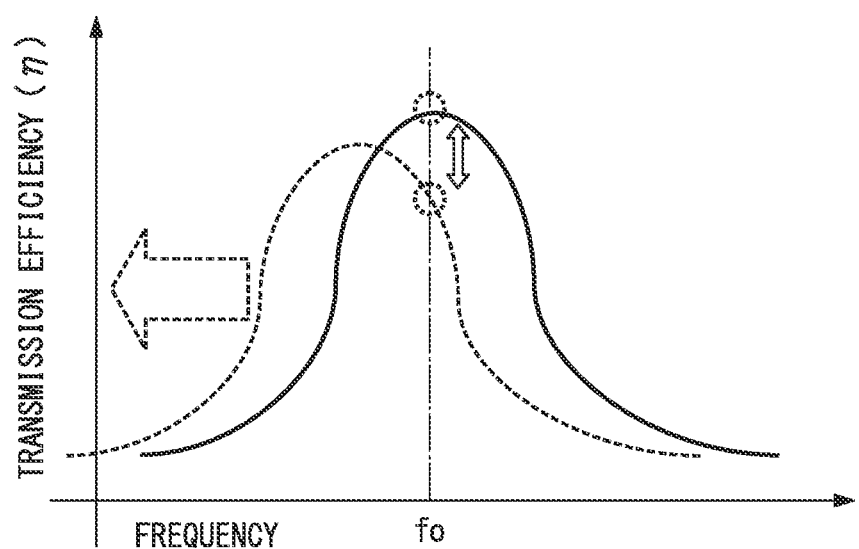
FIG. 13 is a graph showing an example of a changed resonance frequency.

FIG. 13 is a graph in which the vertical axis represents the transmission efficiency η and the horizontal axis represents the frequency f. In the drawing, a solid line is a graph showing a state where the maximum value ηmax is obtained, that is, before the resonance frequency F is adjusted by the LC adjusting circuit 15 (before the change). A broken line is a graph after the resonance frequency F is adjusted by the LC adjusting circuit 15 in a direction of decreasing the transmission efficiency η_out (after the change). The power frequency is fixed to a frequency f0, at which the maximum efficiency (maximum value ηmax)

before the adjustment is obtained, regardless of before the adjustment and after the adjustment.

For example, when decreasing the transmission efficiency η_out from the maximum value ηmax, first, at least one of the induction coefficient (L) and electrostatic capacity (C) is changed by the LC adjusting circuit 15 of the vehicle 100. Then, the graph is shifted in any of the left and right directions of FIG. 13. That is, since the power frequency is fixed to the frequency f0 by the oscillation circuit 25, the transmission efficiency η_out decreases. FIG. 13 shows a case where the graph is shifted (changes) to the left. At least one of the induction coefficient (L) and electrostatic capacity (C) is changed in an opposite direction to the above-described direction from the state where the transmission efficiency η_out is decreased, thereby it is possible to increase the transmission efficiency η_out. When the LC is increased by the LC adjusting circuit 15, the graph is shifted to the left, and when the LC is decreased, the graph is shifted to the right.

Figure 14:
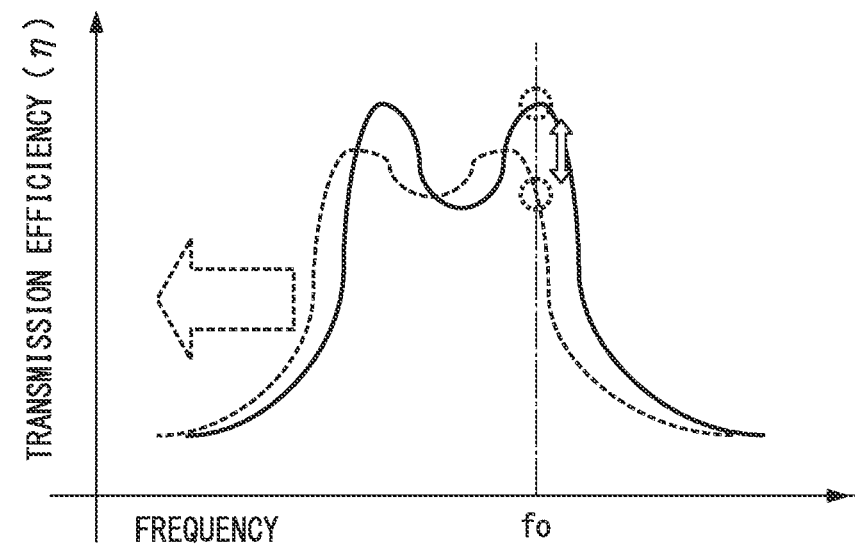
FIG. 14 is a graph showing an example a changed resonance frequency, and is a graph showing an example where there are two crests.

In FIG. 13, although an example where the number of peaks of the graph of the resonance frequency F is one crest has been described, as shown in FIG. 14, even when the number of peaks is two crests, similarly, it is possible to increase and decrease the transmission efficiency η_out. However, when the number of peaks is two crests, the shift direction of the graph is changed depending on a peak, on which the frequency f0 as the set value of the power frequency by the oscillation circuit 25 is present, from among the peaks of the two crests of the resonance frequency F. For example, when the maximum value of the transmission efficiency η_out is on the right crest, the LC of the LC adjusting circuit 15 may be decreased to shift the graph to the left as indicated by a broken line. Though not shown, when the maximum value of the transmission efficiency η_out is on the left crest, the LC may be increased by the LC adjusting circuit 15 to shift the graph to the right.

Figure 15:
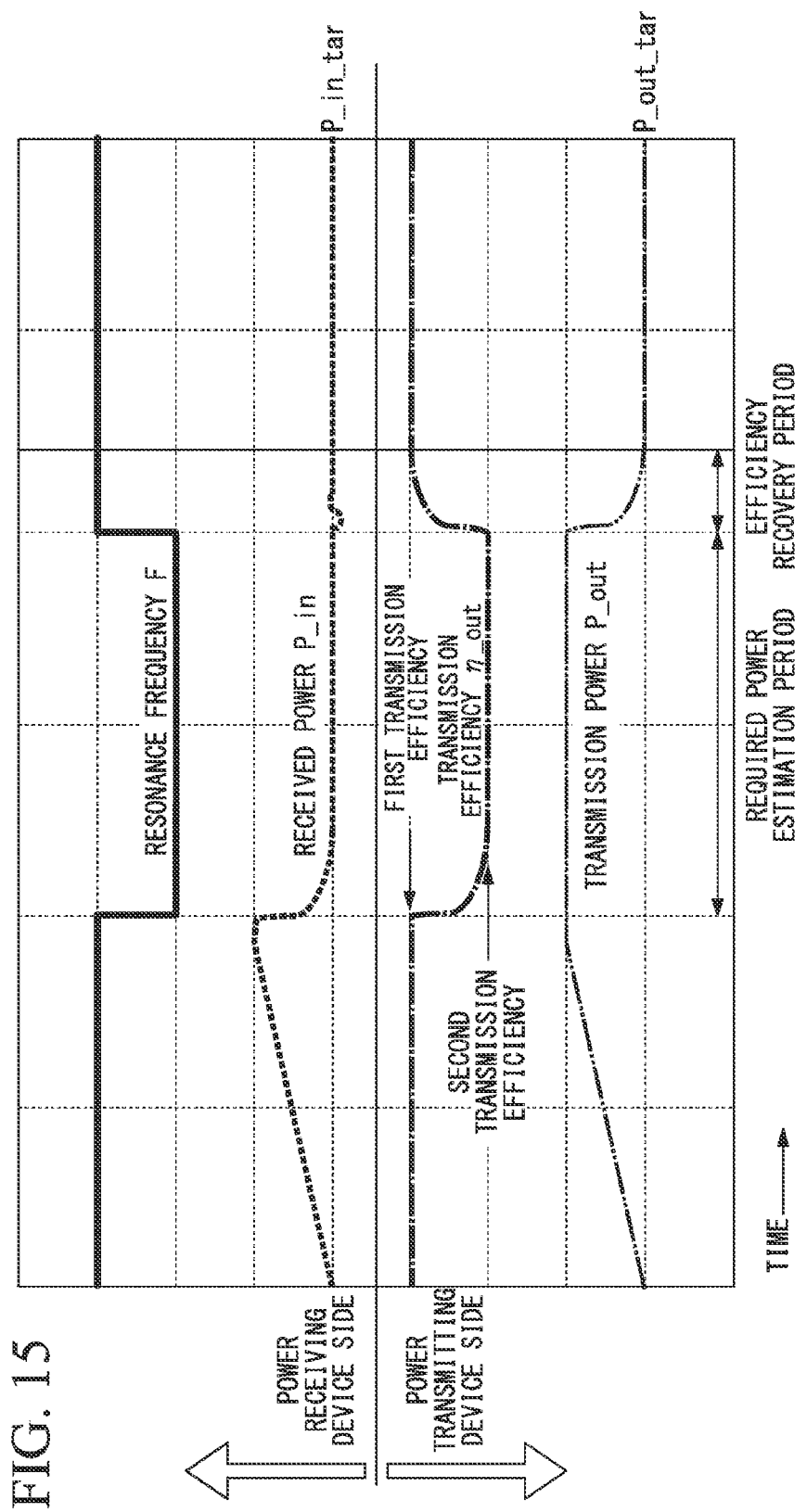
FIG. 15 is a timing chart showing the operation of the wireless charging system.

FIG. 15 is a timing chart showing variations in the resonance frequency F, the received power P_in, the transmission efficiency η_out, and the transmission power P_out by a sequence of control processing in the wireless charging system of the first embodiment. In the following description, the vehicle 100 is called the power receiving device side, and the charging station 200 is called the power transmitting device side.

As shown in FIG. 15, first, when starting wireless power transmission, the power frequency is swept by the power transmission-side initial processing and set to the frequency at which the transmission efficiency η_out becomes the maximum value ηmax. In this state, if the transmission power P_out is gradually increased, the received power P_in gradually increases along with an increase in the transmission power P_out.

Next, after the received power P_in is increased to a certain extent, the resonance frequency F is changed by the LC adjusting circuit 15 such that the received power P_in becomes the required power P_in_tar on the power reception side smaller than P_in, and thus, the transmission efficiency η_out between the transmitting antenna 21 and the receiving antenna 11 is decreased. The received power P_in decreases to the required power P_in_tar in accordance with a decrease in the transmission efficiency η_out. In the transmission efficiency η_out of FIG. 15, an initial high value is first transmission efficiency, and a value which decreases from the initial value and becomes constant is second transmission efficiency.

For example, a case where the required power P_in_tar is set to zero, for example, when the battery 10 is fully charged is considered. In this case, the resonance frequency F is changed until the received power P_in becomes zero by the variable frequency processing of FIG. 8 described above. As a result, the transmission efficiency η_out decreases from the maximum value max to zero. In this case, the transmission efficiency η_out which is set to zero is the second transmission efficiency smaller than the first transmission efficiency (maximum value ηmax).

Next, if it is detected that the transmission efficiency η_out is decreased and is stable on the power transmitting device side, the transmission power target value P_out_tar, which is the estimated value of the required power P_in_tar on the power receiving device side, is obtained by integration of the transmission efficiency η_out (second transmission efficiency) and the transmission power P_out.

Then, on the power transmitting device side, the transmission power P_out is decreased so as to converge on the transmission power target value P_out_tar.

At this time, although on the power receiving device side, the received power P_in decreases from the required power P_in_tar along with the decrease of the transmission power P_out, the resonance frequency F is adjusted such that the received power P_in becomes equal to the required power P_in_tar. Accordingly, the resonance frequency F returns such that the transmission efficiency η_out increases, and the transmission efficiency out is changed to the transmission efficiency out greater than the second transmission efficiency.

That is, while a state in which the received power P_in is maintained so as to meet the required power P_in_tar, the transmission efficiency η_out between the transmitting antenna 21 and the receiving antenna 11 can be recovered, and the received power P_in which matches the required power P_in_tar on the power receiving device side can be efficiently supplied to the power receiving device side. In FIG. 15, a period (required power estimation period) in which the required power P_in_tar is estimated on the power transmitting device side and a period (efficiency return period) in which the transmission efficiency out is returned are respectively indicated by arrows.

According to the wireless charging system 1 of the first embodiment described above, it is possible to match the received power P_in to the required power P_in_tar by changing the resonance frequency F by the change of at least one of the induction coefficient (L) and electrostatic capacity (C) of the receiving antenna 11 of the vehicle 100. For this reason, it is possible to prevent the receiving antenna 11 of the vehicle 100 from being overheated due to the supply of excessive received power P_in.

When the required power P_in_tar of the vehicle 100 is zero, for example, when charging is not required, the resonance frequency F may be changed to make the received power P_in zero.

Since it is possible to match the received power P_in to the required power P_in_tar of the vehicle 100 without using communication equipment or signal conversion equipment for transmitting information of the required power P_in_tar from the vehicle 100 to the charging station 200, it is possible to prevent the device configuration from becoming complicated.

Additionally, it is possible to estimate the required power P_in_tar of the vehicle 100 in the charging station 200 from the transmission efficiency η_out (second transmission efficiency) after the change and the transmission power P_out on the basis of the transmission efficiency η_out between the transmitting antenna 21 of the charging station 200 and the receiving antenna 11 of the vehicle 100 when the received power P_in is matched to the required power P_in_tar of the vehicle 100 due to the resonance frequency F on the vehicle 100 side. It is also possible to reduce the number of components compared to a case where a device which transmits and receives information of required power is provided.

In the charging station 200, if the transmission power P_out is changed so as to become the estimated required power P_in_tar, that is, the transmission power target value P_out_tar, the received power P_in decreases. In order to compensate for the decrease, the resonance frequency F is changed such that the transmission efficiency η_out increases in the vehicle 100. As a result, it is possible to transmit the transmission power P_out according to the required power P_in_tar of the vehicle 100 with high transmission efficiency.

Next, a wireless charging system according to a second embodiment of the invention will be described referring to a flowchart. Since the system configuration of the wireless charging system of the second embodiment is the same as in the first embodiment, a description will be provided while the same processing as in the first embodiment is represented by the same reference numeral.

Figure 16:
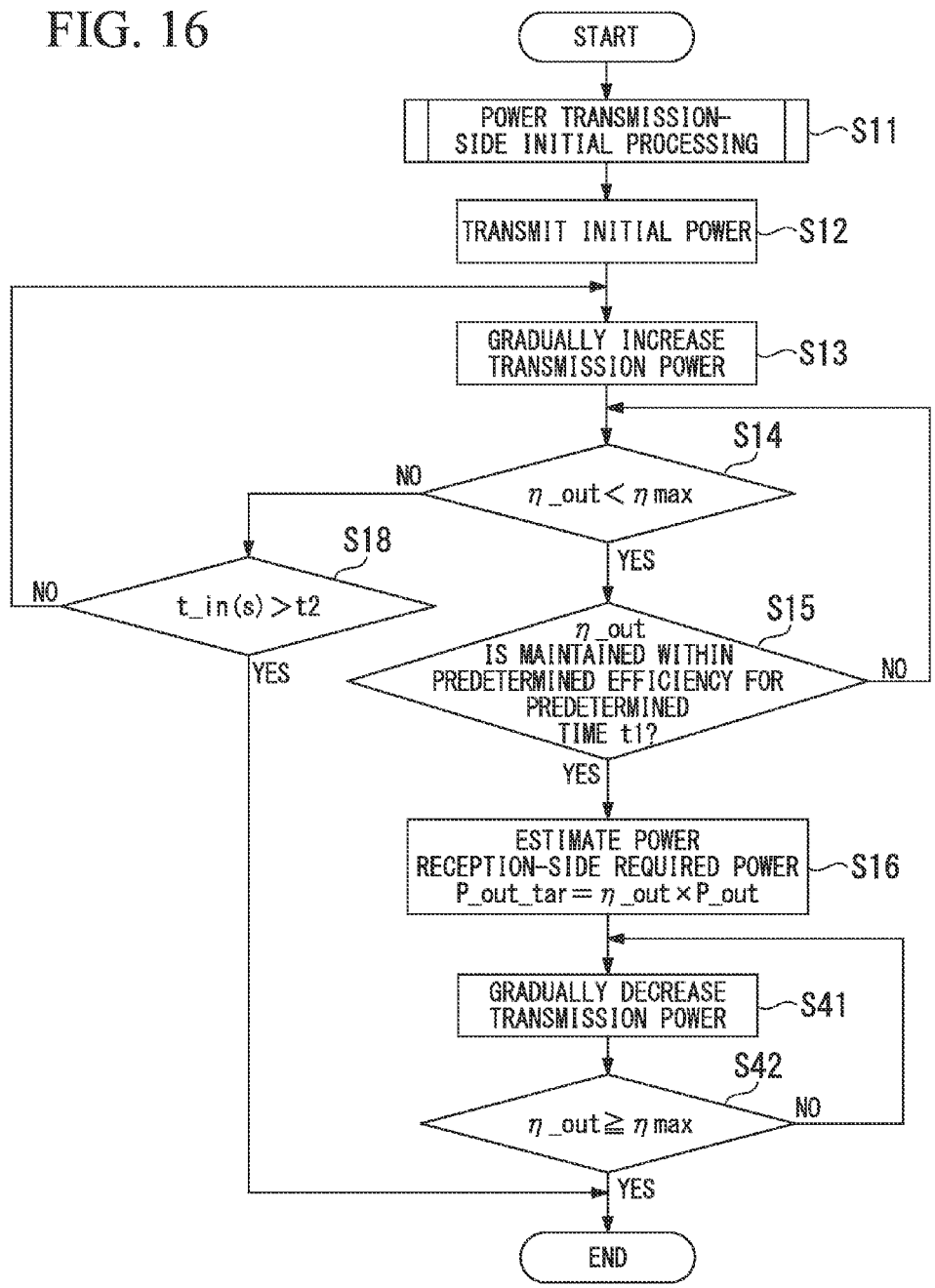
FIG. 16 is a flowchart of power transmission-side processing of a wireless charging system according to a second embodiment of the invention.

First, power transmission-side processing in the control device 26 of the charging station 200 of the second embodiment will be described with reference to the flowchart of FIG. 16.

First, similarly to the power transmission-side processing of the first embodiment, the control device 26 performs the control processing of Step S11 to Step S13.

Similarly to the first embodiment, in Step S14, it is determined whether or not the transmission efficiency η_out calculated from the $S_{11}$ parameter is smaller than the maximum value ηmax of the transmission efficiency which is set in advance. When the determination result is "NO" (η_out≥ηmax), the process progresses to Step S18. When the determination result in Step S14 is "YES" (η_out<ηmax), the process progresses to Step S15.

In Step S18, since the transmission efficiency η_out is in a state still not yet lower than ηmax, it is determined whether or not the required power estimation period t_in (s) is greater than the predetermined elapsed time t2, which is the threshold value of the required power estimation period t_in (s) set in advance.

When the determination result is "YES" (t_in (s)>t2), since it is a state in which the transmission efficiency η_out does not decrease by any factor, a sequence of processing temporarily ends.

When the determination result is "NO" (t_in (s)≤t2), the process returns to the above-described processing in Step S13, and continues to increase the transmission power P_out.

In Step S15, it is determined whether or not the transmission efficiency η_out is maintained within predetermined efficiency for the predetermined time t1.

When the determination result is "NO" (the transmission efficiency η_out is not maintained within predetermined efficiency), the process returns to the processing in Step S14.

When the determination result is "YES" (the transmission efficiency η_out is maintained within predetermined efficiency), since it is in a state in which the transmission efficiency η_out is decreased and stable, that is, the transmission efficiency η_out is in a stable state with the second transmission efficiency, the process progresses to Step S16.

In Step S16, the transmission efficiency η_out and the transmission power P_out are integrated to obtain the estimated value of the required power P_in_tar, that is, the transmission power target value P_out_tar.

Next, in Step S41, the transmission power P_out is gradually decreased such that the transmission power P_out becomes equal to the transmission power target value P_out_tar.

In Step S42, it is determined whether or not η_out is equal to or greater than ηmax.

When the determination result is "YES" (η_out≥ηmax), a sequence of processing described above temporarily ends.

When the determination result is "NO" (η_out<ηmax), the process returns to Step S41, and the above-described processing for gradually decreasing the transmission power P_out is repeated.

That is, in the power transmission-side processing of the second embodiment described above, after the transmission power P_out is gradually increased, when the transmission efficiency η_out is decreased lower than the maximum value ηmax by changing the resonance frequency F on the power reception side, and when it is confirmed that the decreased transmission efficiency η_out is stable, the transmission power P_out and the transmission efficiency η_out, which is the second transmission efficiency, are integrated to obtain the transmission power target value P_out_tar. The transmission power P_out is gradually decreased so as to become the obtained transmission power target value P_out_tar.

Since the power reception-side processing of the second embodiment is the same as the power reception-side processing of the first embodiment described above, a description thereof will not be repeated here.

Next, variable frequency (F) processing in the second embodiment will be described with reference to the flowchart of FIG. 17.

Figure 17:
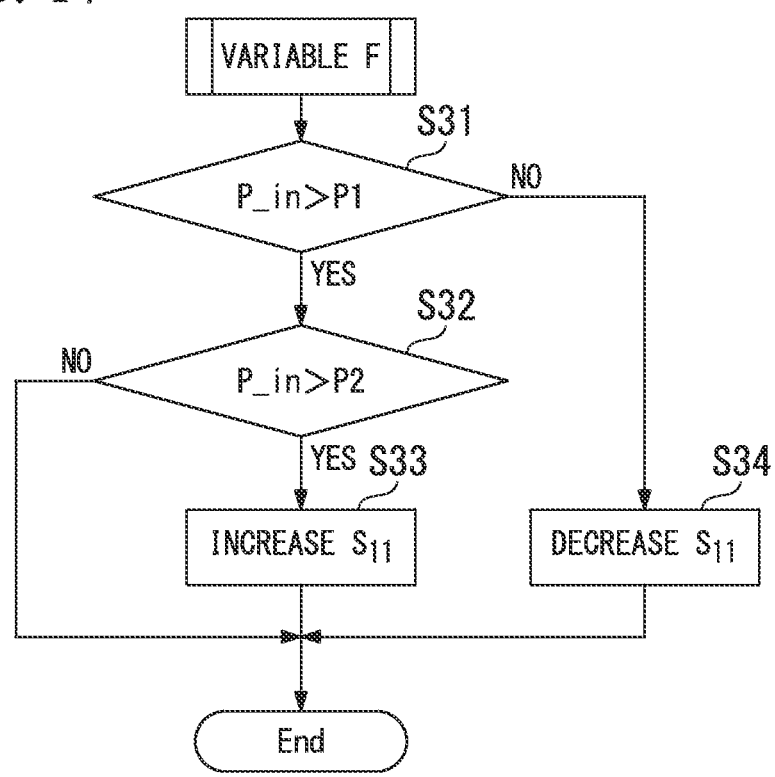
FIG. 17 is a flowchart of variable frequency processing of the wireless charging system of the second embodiment.

First, in Step S31 shown in FIG. 17, the vehicle control device 16 determines whether or not the received power P_in is greater than the predetermined lower limit P1.

When the determination result is "NO" (P_in≤P1), the process progresses to Step S34.

When the determination result is "YES" (P_in>P1), the process progresses to Step S32.

As in the first embodiment, the lower limit P1 is a value obtained by subtracting the predetermined value ΔP from the required power P_in_tar which is the target value of the received power P_in.

In Step S34, the resonance frequency F is adjusted in a direction of decreasing the $S_{11}$ parameter, that is, in a direction of increasing the transmission efficiency η_in, and then, a sequence of processing described above temporarily ends.

In Step S32, it is determined whether or not the received power P_in is greater than the predetermined upper limit P2.

When the determination result is "YES" (P_in>P2), the process progresses to Step S33.

When the determination result is "NO" (P_in≤P2), a sequence of processing described above temporarily ends.

As in the first embodiment, the upper limit P2 is a value obtained by adding the predetermined value ΔP to the required power P_in_tar.

In Step S33, the resonance frequency F is adjusted in a direction of increasing the $S_{11}$ parameter, that is, in a direction of decreasing the transmission efficiency η_in, and a sequence of processing described above temporarily ends.

That is, while the variable frequency processing of the first embodiment performs feedforward control in Step S35, the variable frequency processing of the second embodiment gradually brings the received power P_in close to the required power P_in_tar only by feedback control.

Figure 18:
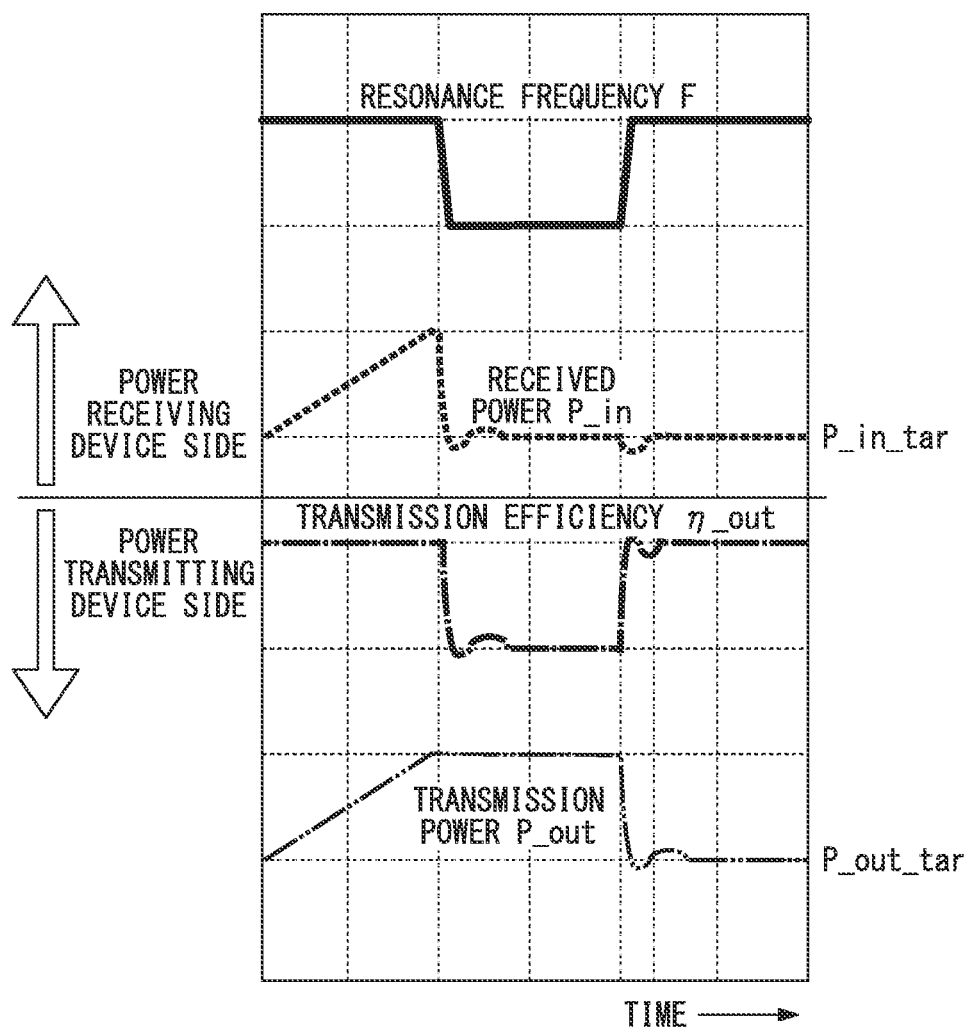
FIG. 18 is a timing chart showing the operation of the wireless charging system of the second embodiment.

FIG. 18 is a graph when the received power P_in is gradually brought close to the required power P_in_tar by the feedback control.

As shown in FIG. 18, when feedback control is performed, the received power P_in is gradually changed compared to a case performing a feedforward control, and the time necessary until the received power P_in converges on the required power P_in_tar is slightly extended compared to a case performing a feedforward control. Since the received power P_in is gradually decreased, the inclination due to the increase or the decrease in the change of the resonance frequency F is gentle compared to a case in which the feedforward control is used (see FIG. 15).

Since the transmission power P_out is gradually decreased by the processing in Step S41 so as to bring the transmission power P_out close to the transmission power target value P_out_tar, the time necessary until the transmission power P_out is converged on the required power P_in_tar is slightly extended compared to the above-described first embodiment (see FIG. 15).

Therefore, according to the wireless charging system of the second embodiment, unlike the first embodiment, even if the table of the transmission efficiency target value ηtar and the resonance frequency F or the map of the transmission efficiency target value ηtar and the resonance frequency F for each combination of transmitting antenna 21 and receiving antenna 11 is not used, the transmission power target value P_out_tar which is the estimated value of the required power P_in_tar of the vehicle 100 is obtained in the charging station 200, making it possible to converge the transmission power P_out on the transmission power target value P_out_tar.

The invention is not limited to the configuration of each embodiment, and design change may be made within the scope without departing from the spirit of the invention.

INDUSTRIAL APPLICABILITY

According to the wireless power transmission method, it is possible to change the resonance frequency by a change of at least one of the induction coefficient and electrostatic capacity of the resonance antenna of the power receiving device to match the received power to the required power of the power receiving device. For this reason, it is possible to prevent the resonance antenna of the power receiving device from being overheated due to the supply of excessive power.

Moreover, since the received power can be matched to the required power of the power receiving device without using communication equipment or signal conversion equipment which transmits information regarding the required power from the power receiving device to the power transmitting device, it is possible to prevent the device configuration from becoming complicated.

When the required power of the power receiving device is zero, for example, when charging is not required, it is also possible to make the received power zero by changing the resonance frequency.

REFERENCE SIGNS LIST

10: battery
11: receiving antenna (resonance antenna)
16: vehicle control device
21: transmitting antenna (resonance antenna)
22: AC power supply
25: oscillation circuit
26: control device

The invention claimed is:

1. A wireless power transmission method that transmits power from a first resonance antenna to a second resonance antenna in a noncontact manner through resonance of a magnetic field, the first resonance antenna being a resonance antenna of a power transmitting device, the second resonance antenna being a resonance antenna of a power receiving device, the wireless power transmission method comprising the steps of:
   setting transmission efficiency between the first resonance antenna and the second resonance antenna as first transmission efficiency by changing a frequency of supply power of the power transmitting device;
   gradually increasing power transmitted from the first resonance antenna to the second resonance antenna; and
   changing a resonance frequency by a change of at least one of an induction coefficient and electrostatic capacity of the second resonance antenna to change the transmission efficiency between the first resonance antenna and the second resonance antenna to second transmission efficiency smaller than the first transmission efficiency, thereby matching received power to required power of the power receiving device.

2. The wireless power transmission method according to claim 1,
   wherein the power transmitting device monitors the transmission efficiency between the first resonance antenna and the second resonance antenna and estimates the required power on the basis of the change in the transmission efficiency.

3. The wireless power transmission method according to claim 2,
   wherein the power transmitting device changes transmission power so as to become equal to the estimated required power, and
   the power receiving device changes the resonance frequency by a change of at least one of the induction coefficient and the electrostatic capacity of the second resonance antenna such that the received power becomes equal to the required power, thereby changing the transmission efficiency between the first resonance antenna and the second resonance antenna to third transmission efficiency greater than the second transmission efficiency.

* * * * *